(12) United States Patent
Kim

(10) Patent No.: US 8,660,753 B2
(45) Date of Patent: Feb. 25, 2014

(54) CONTROL METHOD OF WHEEL ALIGNMENT APPARATUS USING MOTOR DRIVEN POWER STEERING

(71) Applicant: Hyundai Mobis Co., Ltd., Seoul (KR)

(72) Inventor: Jeong Ku Kim, Yongin-si (KR)

(73) Assignee: Hyundai Mobis Co., Ltd. (KR)

( * ) Notice: Subject to any disclaimer, the term of this patent is extended or adjusted under 35 U.S.C. 154(b) by 0 days.

(21) Appl. No.: 13/886,214

(22) Filed: May 2, 2013

(65) Prior Publication Data

US 2013/0297150 A1    Nov. 7, 2013

(30) Foreign Application Priority Data

May 3, 2012  (KR) .................. 10-2012-0047166

(51) Int. Cl.
*G06F 19/00*  (2011.01)

(52) U.S. Cl.
USPC .............. 701/41; 701/122; 701/38; 701/42; 701/48; 701/69; 536/23.1; 536/26.6; 536/24.3; 536/24.33; 536/25.3; 514/21.8; 514/21.9; 514/21.91; 180/443; 180/446; 206/363; 206/366; 206/370; 435/6.1; 435/91.1; 530/322

(58) Field of Classification Search
USPC .............. 536/23.1, 26.6, 24.3, 24.33, 25.3; 514/21.8, 21.91, 21.9; 180/443, 444, 180/446; 206/363, 366, 370; 435/6.1, 91.1; 530/322

See application file for complete search history.

(56) References Cited

U.S. PATENT DOCUMENTS

| | | | |
|---|---|---|---|
| 6,882,917 B2* | 4/2005 | Pillar et al. ................ | 701/48 |
| 7,440,834 B2* | 10/2008 | Yamaguchi et al. ............ | 701/69 |
| 7,577,504 B2* | 8/2009 | Sawada et al. ................ | 701/38 |
| 8,301,353 B2* | 10/2012 | Ono et al. ................ | 701/90 |
| 8,392,068 B2* | 3/2013 | Yamazaki ................ | 701/42 |
| 8,521,349 B2* | 8/2013 | Yu et al. ................ | 701/22 |
| 2003/0168825 A1* | 9/2003 | Henderson ................ | 280/81.6 |
| 2004/0002794 A1* | 1/2004 | Pillar et al. ................ | 701/1 |
| 2006/0015236 A1* | 1/2006 | Yamaguchi et al. ............ | 701/69 |

FOREIGN PATENT DOCUMENTS

KR    10-2010-0007321 A    1/2010

* cited by examiner

*Primary Examiner* — McDieunel Marc
(74) *Attorney, Agent, or Firm* — Knobbe Martens Olson & Bear LLP

(57) ABSTRACT

The present invention relates to a control method of a wheel alignment apparatus using an MDPS, which determines whether or not to cancel center alignment control due to a trouble or error is preferentially determined prior to each control step and then performs control when wheels of a vehicle having an MDPS mounted therein are aligned, such that the trouble or error is preferentially considered in the control priority, thereby increasing driver's convenience and improving safety performance for protecting the driver.

5 Claims, 3 Drawing Sheets

CONTROL METHOD OF WHEEL ALIGNMENT APPARATUS USING MOTOR DRIVEN POWER STEERING

CROSS-REFERENCES TO RELATED APPLICATIONS

The present application claims priority to Korean application number 10-2012-0047166, filed on May 3, 2012, which is incorporated by reference in its entirety.

BACKGROUND OF THE INVENTION

The present invention relates to a control method of a wheel alignment apparatus using a motor-driven power steering (MDPS), and more particularly, to a control method of a wheel alignment apparatus using an MDPS, which decides a control priority when wheels of a vehicle having an MDPS mounted therein are aligned, thereby improving safety to protect a driver.

Examples of an electronic control unit (ECU) applied to a vehicle may include an MDPS which relieves an operational force for a steering wheel according to the speed of the vehicle such that a driver rapidly operates the steering wheel.

The MDPS receives input signals from a steering angle sensor, a torque sensor, a vehicle speed sensor, and an RMP sensor when the ECU controls the steering wheel, calculates a current value corresponding to a torque value, and supplies the calculated current value to an MDPS motor. Then, the MDPS motor rotates a universal joint through rotations, and operates a pinion and rack using the rotational force of the universal joint such that wheels are steered through a tie rod. Accordingly, the MDPS has more excellent steering performance and steering feeling than a hydraulic power steering.

A related art has been disclosed in Korean Patent Laid-open Publication No. 10-2010-0007321 (Jan. 22, 2010) titled "Wheel alignment apparatus".

Although the MDPS is used, a driver may feel uncomfortable when the driver performs center alignment of wheels after parking. Furthermore, when the driver starts a vehicle in a state where the center alignment of the wheels is not accomplished, the vehicle may rear-end another vehicle.

SUMMARY OF THE INVENTION

Embodiments of the present invention are directed to a control method of a wheel alignment apparatus using an MDPS, which determines whether or not to cancel center alignment control due to a trouble or error is preferentially determined prior to each control step and then performs control when wheels of a vehicle having an MDPS mounted therein are aligned, such that the trouble or error is preferentially considered in the control priority, thereby increasing driver's convenience and improving safety performance for protecting the driver.

In one embodiment, a control method of a wheel alignment apparatus using a MDPS includes: determining, by a wheel alignment control unit, whether or not a current condition is a compulsory cancellation condition during initialization, and then determining whether or not a current state is a standby state; determining whether the current condition is the compulsory cancellation condition when it is determined that the current condition is the standby state, and receiving a state of a vehicle when an operating command for center alignment of wheels of the vehicle is inputted; determining whether the current condition is the compulsory cancellation condition or a normal cancellation condition, through the received vehicle state; generating a request value for center alignment of the wheels by determining the operating state, when the current condition is the normal cancellation condition; and receiving the vehicle state to determine whether the current condition is the compulsory cancellation condition or the normal cancellation condition, and driving an MDPS based on the request value.

The standby state may include a state in which a gearshift is positioned at a parking state or neural state and the MDPS is in a normal state.

The compulsory cancellation condition may include determining whether or not a fatal error to stop the MDPS occurs in main functions, and the normal cancellation condition may include determining whether or not a warning error occurs in auxiliary functions.

When the current condition is the compulsory cancellation condition, the center alignment control for the wheels may be compulsorily canceled and initialized, and when the current condition is the normal cancellation condition, the center alignment control for the wheels may be normally canceled, and the current state may be switched to the standby state.

The generating of the request value may include generating the request value when an engine rotation number falls within a preset range, a battery voltage is equal to or more than a reference voltage, a steering angle is equal to or more than a reference steering angle, and vehicle speed corresponds to a standstill state, and switching the current state to the standby state when the conditions are not satisfied.

DESCRIPTION OF SPECIFIC EMBODIMENTS

Hereinafter, exemplary embodiments of the present invention will be described in detail with reference to the accompanying drawings. The drawings are not necessarily to scale and in some instances, proportions may have been exaggerated in order to clearly illustrate features of the embodiments. Furthermore, terms to be described below have been defined by considering functions in embodiments of the present invention, and may be defined differently depending on a user or operator's intention or practice. Therefore, the definitions of such terms are based on the overall descriptions of the present specification.

Figure 1:
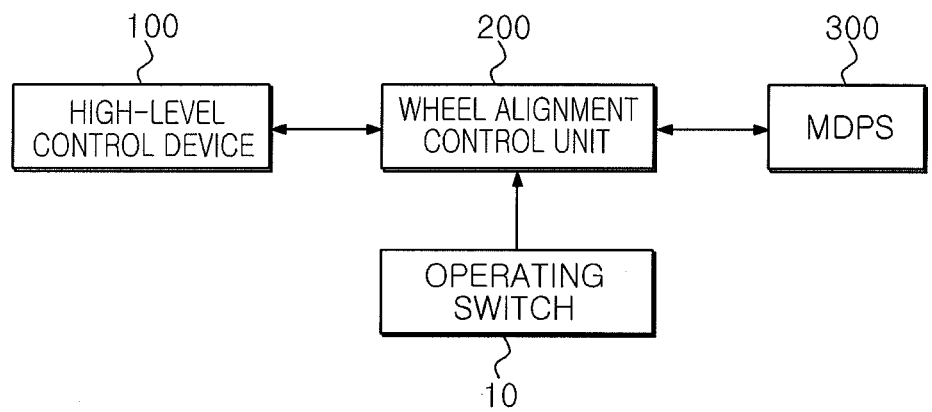
FIG. 1 is a block configuration diagram schematically illustrating a vehicle alignment apparatus using an MDPS in accordance with an embodiment of the present invention.
Figure 2:
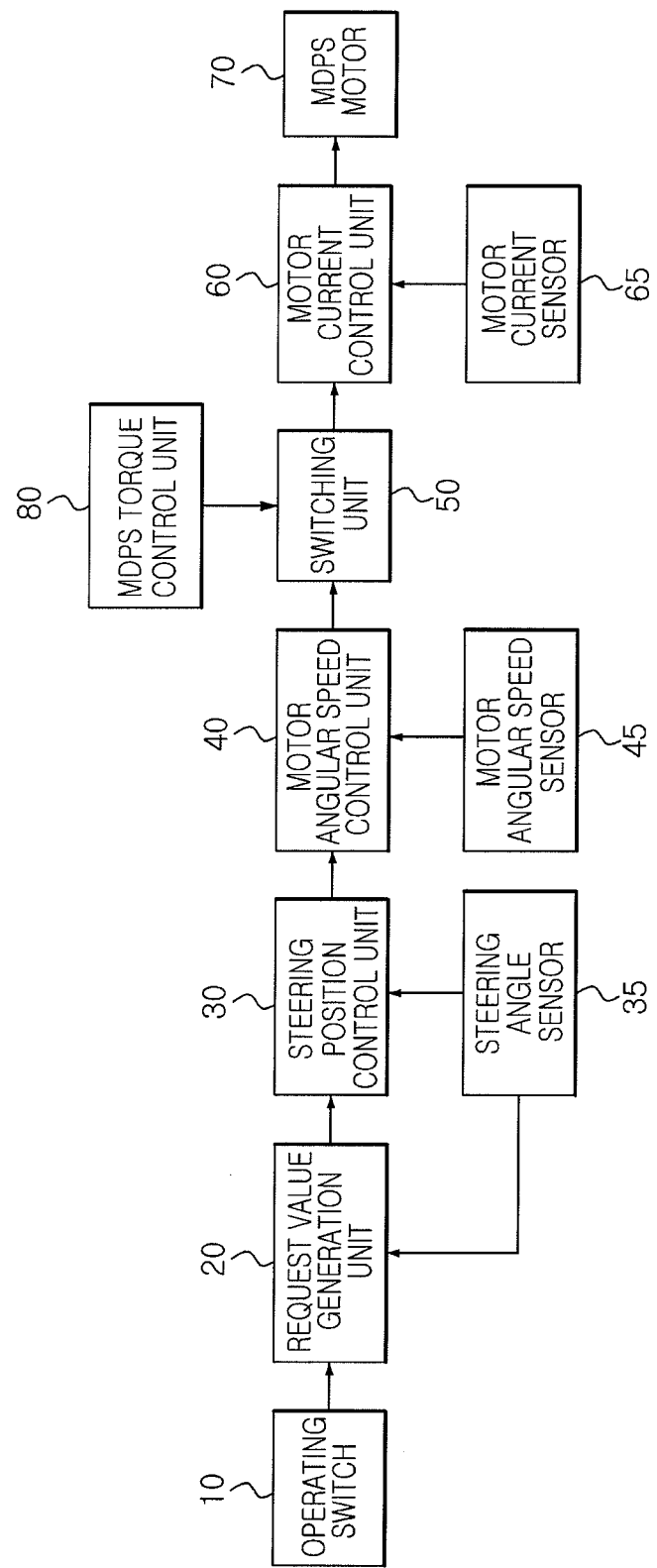
FIG. 2 is a detailed block configuration diagram of the vehicle alignment apparatus using an MDPS in accordance with the embodiment of the present invention.

FIG. 1 is a block configuration diagram schematically illustrating a vehicle alignment apparatus using an MDPS in accordance with an embodiment of the present invention. FIG. 2 is a detailed block configuration diagram of the vehicle alignment apparatus using an MDPS in accordance with the embodiment of the present invention.

FIG. 1 illustrates a vehicle alignment apparatus using an MDPS in accordance with an embodiment of the present invention.

Referring to FIG. 1, a wheel alignment control unit 200 is configured to receive a state of a vehicle from a plurality of high-level control devices 100 connected through control area network (CAN) communication and installed in the vehicle, and determine whether or not a current condition is a compulsory cancellation condition for center alignment control of wheels, prior to normal center alignment control of the wheels. Then, when the determination result is normal and an operating command for center alignment of the wheels is inputted from an operating switch 10, the vehicle alignment control unit 200 receives the state of the vehicle again, and determines whether the current condition is the compulsory cancellation condition or a normal cancellation condition for the center alignment control of the wheels. Then, the vehicle alignment control unit 200 determines operating state of the vehicle, and generates a request value for the center alignment of the wheels when the conditions are satisfied. Then, based on the generated request value, an angular speed control value for driving the MDPS 300 is outputted to perform the center alignment of the wheels.

Furthermore, even before the MDPS 300 is driven after the request value is generated, a compulsory cancellation condition depending on whether a fatal error occurs or not may be determined, and a normal cancellation condition depending on whether a warning error occurs or not may be determined. Then, the control priority is set to perform the center alignment when the current condition is normal.

Specifically, referring to FIG. 2, the wheel alignment apparatus using an MDPS in accordance with the embodiment of the present invention includes the wheel alignment control unit 200, an operating switch 10, a switching unit 30, and the MDPS 300. The wheel alignment control unit 200 includes a request value generation unit 20, a steering position control unit 30, a motor angular speed control unit 40, and a motor current control unit 60. The MDPS 300 includes an MDPS motor 70 and an MDPS torque control unit 80.

The request value generation unit 20 is configured to generate a profile for center alignment of wheels according to a steering angle inputted from a steering angle sensor 35 when an operating command for aligning wheels of a vehicle having the MDPS 300 mounted therein with the center is inputted.

At this time, the operating command is generated when a driver operates the operating switch 10 for center alignment of the wheels after parking.

The steering position control unit 30 is configured to calculate a target steering angular speed for center alignment through the profile generated from the request value generation unit 20 and the steering angle inputted from the steering angle sensor 35 and converts the target steering angular speed into a motor angular speed.

The motor angular speed control unit 40 is configured to generate a driving current for driving the MDPS motor 70 through the motor angular speed inputted from the steering position control unit 30 and the motor angular speed inputted from the motor angular sensor 45.

The motor current control unit 60 is configured to compare the driving current generated by the motor angular speed control unit 40 to a motor current measured by the motor current sensor 65 and drive the MDPS motor 70.

The wheel alignment apparatus using an MDPS in accordance with the embodiment of the present invention includes the switching unit 50 configured to selectively output a driving current outputted from the MDPS torque control unit 80 of the MDPS 300 and the driving current generated by the motor angular speed control unit 40 to the motor current control unit 60.

That is, the MDPS torque control unit 80 outputs a driving current for generating an assist force according to a driver's steering intention, when the driver steers the steering wheel.

Therefore, when the driver's steering intention is detected, the driving current outputted from the MDPS torque control unit 80 is switched and inputted to the motor current control unit 60 through the switching unit 50, in order to drive the MDPS motor 70 according to the driver's steering intention.

Figure 3:
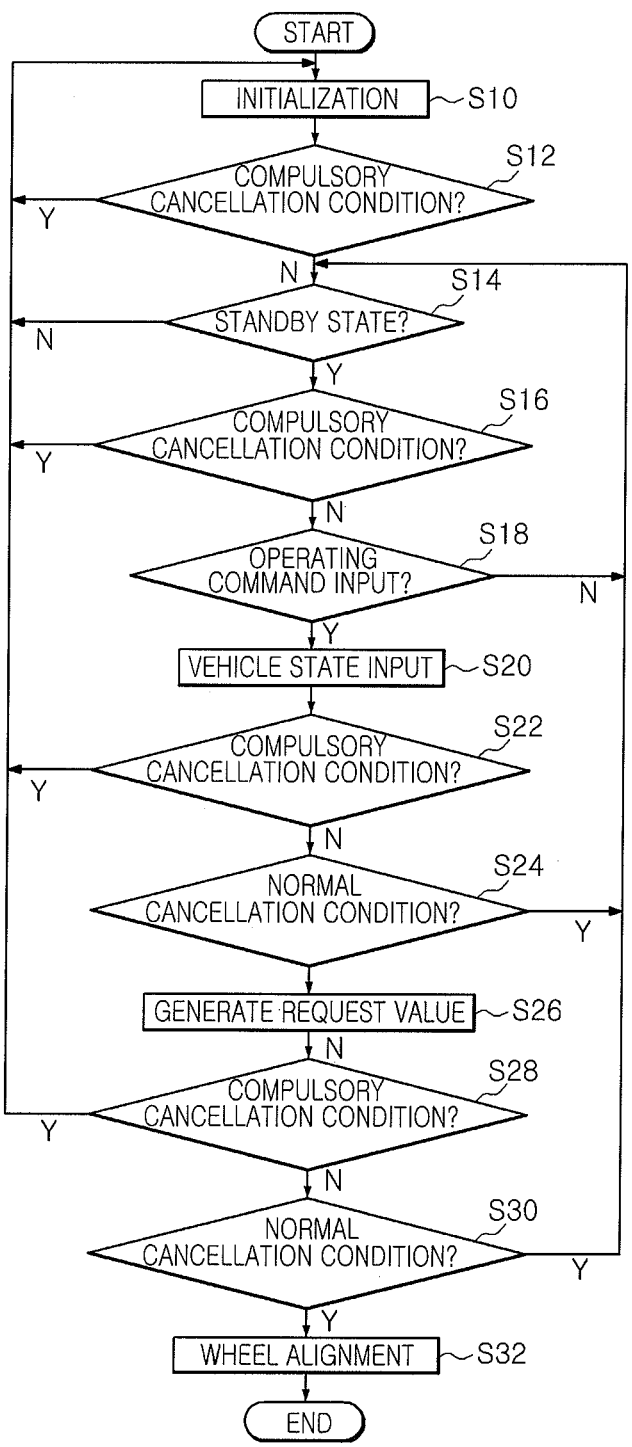
FIG. 3 is a flowchart for explaining a control method of the wheel alignment apparatus using an MDPS in accordance with the embodiment of the present invention.

FIG. 3 is a flowchart for explaining a control method of the wheel alignment apparatus using an MDPS in accordance with the embodiment of the present invention.

Referring to FIG. 3, in the control method of the wheel alignment apparatus using an MDPS in accordance with the embodiment of the present invention, the wheel alignment control unit 200 determines whether a current condition is a compulsory cancellation condition or normal cancellation condition for center alignment control of wheels according to a control priority while checking the state of the vehicle at each step to perform center alignment of the wheels according to a request value, and then performs control for the center alignment of the wheels.

First, when a vehicle is started, the wheel alignment control unit 200, all of the high-level control devices 100, and the MDPS 300 are initialized at step S10.

When the wheel alignment control unit 200, all of the high-level control devices 100, and the MDPS 300 are arbitrarily initialized, a fatal error may occur, or the MDPS 300 may not be normally operated. In this case, restoration to a normal state may be performed.

In this state, whether or not a compulsory cancellation condition for center alignment control of the wheels occurred due to a fatal error is determined at step S12.

At this time, errors of main functions which may stop the operation of the MDPS 300 may be set to the fatal error.

For example, the fatal error may include a case in which an error occurs in a steering angle sensor value, a case in which a vehicle speed signal or a state of a gear shift is not inputted, and a combination thereof.

Then, when a fatal error does not occur, whether or not a current state is a standby state for center alignment of the wheels is determined at step S14.

The standby state is determined through the position of the gearshift, which is inputted from the high-level control devices 100. That is, when the gearshift is positioned in a parking state or neutral state and the MDPS 300 is in a normal state, it is determined as the standby state.

When it is determined that the current state is the standby state, whether the compulsory cancellation condition occurred or not is determined at step S16. When it is determined that the compulsory cancellation condition did not occur, an operating command for center alignment of the wheels is inputted at step S14.

As such, before the respective control operations are performed, whether the compulsory cancellation condition for the center alignment control of the wheels occurred or not may be determined to protect a driver when a malfunction occurs due to a trouble or error of the MDPS 300.

In such a normal state, when an operating command is inputted by the operation of the operating switch 10, a vehicle state for center alignment of the wheels is inputted at step S20.

Various error values including an engine rotation number, a battery voltage, a steering angle, and a vehicle speed are received as values for determining an error state of the vehicle.

Based on the inputted values, the error state of the MDPS 300 is determined to decide whether the compulsory cancellation condition or the normal cancellation condition for center alignment control of the wheels occurred or not, at steps S22 and S24.

When it is determined that the compulsory cancellation condition occurred due to a fatal error, the control for center alignment of the wheels is compulsorily canceled to perform initialization for restoration, at step S22.

At this time, errors of main functions which may stop the operation of the MDPS 300 may be set to the fatal error.

For example, the fatal error a case in which an error occurs in a steering angle sensor value, a case in which a vehicle speed signal or a state of a gear shift is not inputted, and a combination thereof.

On the other hand, when it is determined that the normal cancellation condition occurred due to a warning error, the control for center alignment of the wheels is normally canceled, the current state is switched to the standby state, and the center alignment of the wheels is performed again at step S24.

In the case of the normal cancellation condition, the MDPS 300 may be operated, but errors occurring in auxiliary functions may be set to warning errors.

For example, the warning errors may include a case in which a rotation engine number signal is not inputted, a case in which a driver operates the steering wheel, a case in which the gearshift is switched from a parking state or neutral state to a different mode, a case in which a battery voltage drops or a vehicle speed is increased to move a vehicle, and combinations thereof.

Furthermore, even when a request value deviating from a preset reference value is inputted while a request value for center alignment of the wheels is generated, it may be determined as the normal cancellation condition.

As such, the state of the vehicle is received to determine whether the current condition is the compulsory cancellation condition and the normal cancellation condition. When the current state is determined as a normal state and the operation state of the vehicle satisfies the preset condition, a request value for center alignment is generated on the basis of the alignment state of the wheels at step S26.

That is, when the operation station satisfies preset conditions, for example, when the engine rotation number ranges from 700 to 1,000 rpm, the battery voltage is equal to or more than a reference voltage of 9V, and the steering angle is equal to or more than a reference steering angle of 25 degrees, and the vehicle speed corresponds to a standstill state, the request value for center alignment is generated based on the alignment state of the wheels.

At this time, when the operation state of the vehicle does not satisfy the above-described conditions, it may be determined as the normal cancellation condition. Then, the control for center alignment of the wheels is normally canceled, and the current state is switched to the standby state.

In order to perform the center alignment of the wheels, the vehicle needs to be stopped, the engine rotation number needs to be in an idle state, and the steering angle needs to be equal to or more than the reference steering angle. Furthermore, the MDPS 300 is operated only when a battery voltage for operating the MDPS 300 is equal to or more than the reference voltage.

Before the wheels are aligned after the request value is generated, whether the compulsory cancellation condition or the normal cancellation condition of the center alignment control occurred or not is determined again at steps S28 and S30.

At this time, when the compulsory cancellation condition occurred, the control for center alignment is compulsorily canceled to perform initialization for restoration at step S28. When the normal cancellation condition occurred, the control for center alignment is normally canceled and the current state is switched to the standby state to perform the center alignment of the wheels again at step S30.

On the other hand, when the current state is a normal state, a target steering angular speed is calculated based on the generated request value, and a driving current for driving the MDPS motor 70 is generated and outputted to the MDPS 300 to align the wheels at step S32.

Then, the MDPS motor 70 is driven to monitor the steering angle. While the steering angle is continuously monitored, whether the center alignment of the wheels is accomplished or not is determined. The MDPS motor 70 is driven until the center alignment is accomplished. When the center alignment is accomplished, the operating command is canceled.

In the control method of the wheel alignment apparatus using an MDPS in accordance with the embodiment of the present invention, when the wheels of the vehicle having the MDPS mounted therein are aligned, whether or not to cancel the center alignment control due to a trouble or error is preferentially determined prior to the respective control steps, and the control is then performed. Accordingly, the trouble or error is preferentially considered in the control priority, which makes it possible to increase driver's convenience and improve safety performance for protecting the driver.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A control method of a wheel alignment apparatus using a motor-driven power steering (MDPS), comprising:
   determining, by at least one processor, whether or not a current condition is a compulsory cancellation condition during initialization, and then determining whether or not a current state is a standby state;
   determining by the at least one processor whether the current condition is the compulsory cancellation condition when it is determined that the current condition is the standby state, and receiving a state of a vehicle when an operating command for center alignment of wheels of the vehicle is inputted;
   determining by the at least one processor whether the current condition is the compulsory cancellation condition or a normal cancellation condition, through the received vehicle state;
   generating a request value for center alignment of the wheels by determining the operating state, when the current condition is the normal cancellation condition; and
   receiving the vehicle state to determine whether the current condition is the compulsory cancellation condition or the normal cancellation condition, and driving an MDPS based on the request value.

2. The control method of claim 1, wherein the standby state comprises a state in which a gearshift is positioned at a parking state or neural state and the MDPS is in a normal state.

3. The control method of claim 1, wherein the compulsory cancellation condition comprises determining whether or not a fatal error to stop the MDPS occurs in main functions, and the normal cancellation condition comprises determining whether or not a warning error occurs in auxiliary functions.

4. The control method of claim 1, wherein when the current condition is the compulsory cancellation condition, the center alignment control for the wheels is compulsorily canceled and initialized, and when the current condition is the normal cancellation condition, the center alignment control for the wheels is normally canceled, and the current state is switched to the standby state.

5. The control method of claim 1, wherein the generating of the request value comprises generating the request value when an engine rotation number falls within a preset range, a battery voltage is equal to or more than a reference voltage, a steering angle is equal to or more than a reference steering angle, and vehicle speed corresponds to a standstill state, and switching the current state to the standby state when the conditions are not satisfied.

\* \* \* \* \*